United States Patent
Vince et al.

[11] Patent Number: 5,937,330
[45] Date of Patent: Aug. 10, 1999

[54] SETTOP TERMINAL CONTROLLED RETURN PATH FILTER FOR MINIMIZING NOISE INGRESS ON BIDIRECTIONAL CABLE SYSTEMS

[75] Inventors: Lawrence Vince, Landsdale; Glen Goffin, Fountainville, both of Pa.

[73] Assignee: General Instrument Corporation, Horsham, Pa.

[21] Appl. No.: 08/801,306

[22] Filed: Feb. 18, 1997

[51] Int. Cl.⁶ .................................................. H04N 7/173
[52] U.S. Cl. ............................................. 455/5.1; 348/12
[58] Field of Search ................................... 348/12, 7, 13, 348/6, 10, 11; 455/5.1, 4.2, 3.1, 6.1, 6.2; 345/327; H04N 7/16, 7/173

[56] References Cited

U.S. PATENT DOCUMENTS

| | | | |
|---|---|---|---|
| 3,750,022 | 7/1973 | Curry et al. | 455/296 |
| 3,835,393 | 9/1974 | Marron | 455/5.1 |
| 3,924,187 | 12/1975 | Dormans | 455/4.2 |
| 4,041,531 | 8/1977 | Bingham | 358/37 |
| 4,520,508 | 5/1985 | Reichert, Jr. | 455/4.2 |
| 4,982,440 | 1/1991 | Dufresne et al. | 455/4 |
| 5,045,816 | 9/1991 | Bramhall et al. | 332/105 |
| 5,142,690 | 8/1992 | McMullan, Jr. et al. | 455/6.1 |
| 5,155,590 | 10/1992 | Beyers, II et al. | 358/86 |
| 5,225,902 | 7/1993 | McMullan, Jr. | 358/86 |
| 5,235,619 | 8/1993 | Beyers, II et al. | 375/38 |
| 5,255,086 | 10/1993 | McMullan, Jr. et al. | 358/86 |
| 5,390,337 | 2/1995 | Jelinek et al. | 455/5.1 |
| 5,742,713 | 4/1998 | Sanders et al. | 455/5.1 |
| 5,745,836 | 4/1998 | Williams | 455/5.1 |
| 5,815,794 | 9/1998 | Williams | 455/5.1 |

*Primary Examiner*—Chris Grant
*Attorney, Agent, or Firm*—Volpe and Koenig, PC

[57] ABSTRACT

A device which eliminates all RF ingress noise from entering the CATV network in the upstream communication path includes a shunt filter, a detector and a filter with a bandwidth equal to the bandwidth of the upstream communication path. The device monitors signals transmitted in the upstream bandwidth and detects when a valid upstream communication is being transmitted. Upon detection of this valid signal, the shunt filter is switched out of the upstream communication path to allow the valid transmission to be sent. When the end of the valid transmission is detected and a predetermined delay has lapsed, the shunt filter is switched to block all upstream transmissions in the upstream communication bandwidth.

13 Claims, 6 Drawing Sheets

SETTOP TERMINAL CONTROLLED RETURN PATH FILTER FOR MINIMIZING NOISE INGRESS ON BIDIRECTIONAL CABLE SYSTEMS

BACKGROUND OF THE INVENTION

1. Field of the Invention

This invention relates generally to cable television communication systems. More particularly, the invention relates to a system which reduces noise ingress in the return communication path of a bi-directional cable television communication system.

2. Description of Related Art

Cable television (CATV) communication networks are being increasingly used for applications that require two-way transmission of data. Bi-directional CATV networks have become commonplace as the diversity of services has grown. Many CATV operators now provide networks which support interactive applications, including home banking and home shopping, or life-saving applications, such as medical alert and alarm services. CATV operators have even begun to challenge the regional bell operating companies (RBOCs) by offering telephone services over CATV networks.

Although bi-directional CATV networks have become commonplace, there are several problems which continue to plague CATV operators in offering interactive services. One of the major problems has been ingress noise, which is unwanted external signals entering the CATV network at weak points in the network such as shield discontinuities, faulty connectors and at a consumer's home through the settop terminal. Ingress noise presents an interfering signal on the CATV network, thereby degrading or even eliminating valid signals transmitted over the CATV network.

Ingress noise is particularly undesirable in bi-directional CATV systems since the bi-directional systems are significantly more susceptible to noise. In the upstream communication path, noise from every point in the CATV network is propagated, added and amplified in the upstream direction. As the signals travel toward the headend of the system each line in the CATV system is amplified and added together. It becomes extremely difficult at the headend, if not impossible, to detect ingress noise from valid signals sent from settop terminals.

One method of reducing ingress noise from settop terminals is to place a filter at each tap location corresponding to homes where no upstream communication equipment is present. This limits the ingress noise sources to tap locations corresponding to homes which utilize the upstream communication path. Since many of the services offered by CATV providers are interactive, nearly all homes utilize the upstream communication path. Therefore, this method of reducing ingress noise has diminishing benefits.

There have been attempts in the prior art to overcome the problems caused by unwanted ingress noise. For example, U.S. Pat. No. 5,235,619; and related U.S. Pat. Nos. 5,225,902; 5,155,590 and 5,142,690 disclose a bi-directional CATV communication system which compensates for unwanted ingress noise by communicating each message from the settop terminals to the headend over a plurality of frequencies and time slots. The headend receives and compares the redundant transmissions to confirm the transmitted message. This system requires high-speed hardware to be located both at the headend and at each settop terminal, resulting in a system which is inefficient and expensive.

Accordingly, there exists a need for a system for enhancing bi-directional CATV communication systems by reducing unwanted ingress noise in the upstream communication path.

SUMMARY OF THE INVENTION

The present invention comprises a device which eliminates ingress noise introduced at each tap location or at any point within the CATV communication network from entering the communication network in the upstream communication path. The device includes a filter with a bandwidth equal to the bandwidth of the upstream communication path which isolates ingress noise energy at the tap location. The device monitors the upstream communication path and detects when a valid communication signal is being transmitted. Upon detection of a valid signal, the filter is switched out of the upstream communication path to allow the valid transmission to be sent. When the end of the valid signal is detected, the filter is switched back to block all upstream transmissions in that bandwidth.

Accordingly, it is an object of the present invention to provide a method for enhancing bi-directional CATV communication systems by decreasing the amount of upstream ingress noise.

Other objects and advantages of the present invention will become apparent to those skilled in the art after reading the detailed description of a presently preferred embodiment.

DETAILED DESCRIPTION OF THE PREFERRED EMBODIMENT

The detailed description of the preferred embodiment will be described with reference to the figures wherein like numerals represent like elements throughout.

Figure 1:
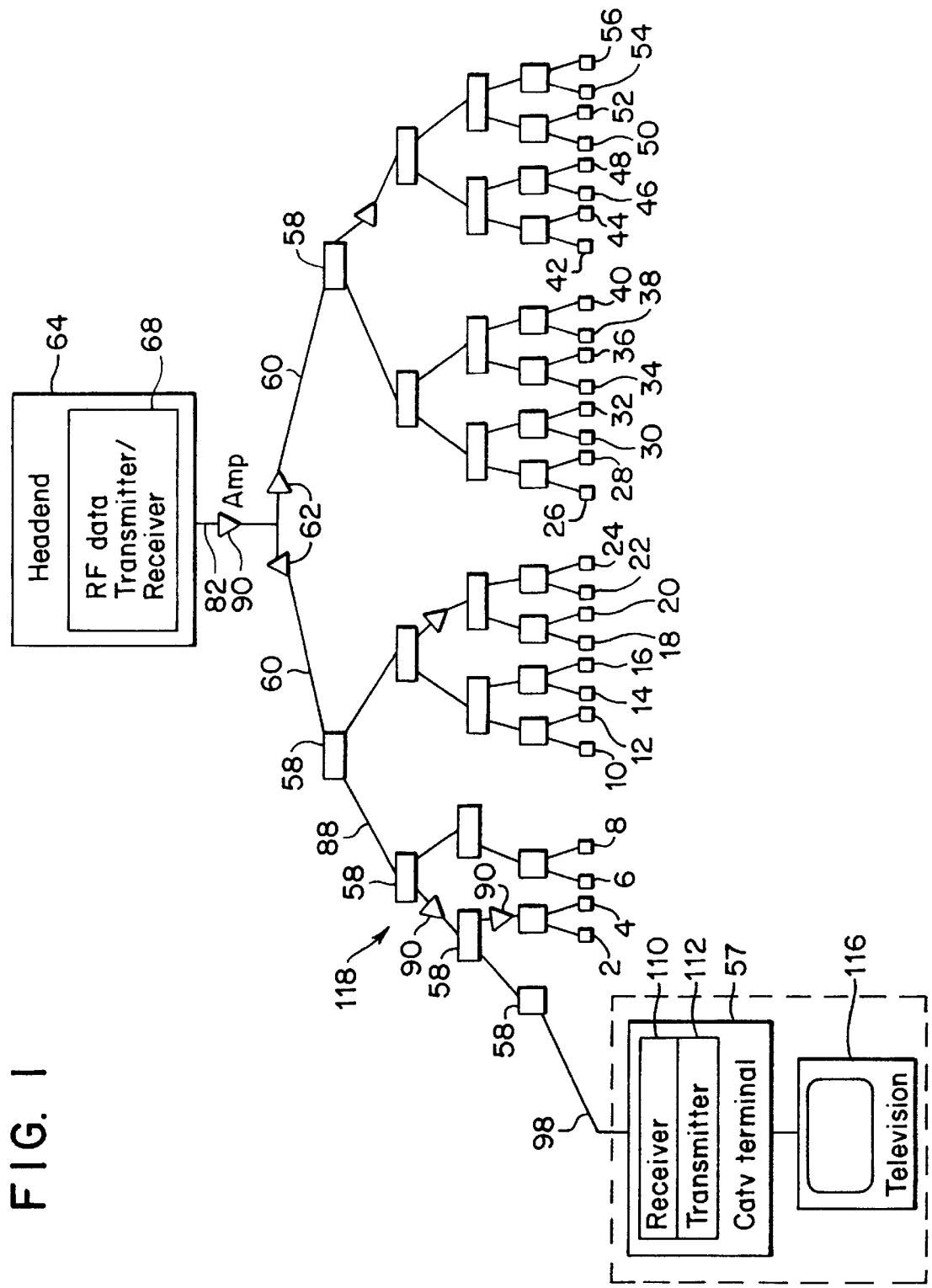
FIG. 1 is a block diagram of a CATV transmission network including the present invention.

A bi-directional CATV network including the ingress noise reduction device of the present invention is shown in FIG. 1. The CATV network 118 is configured in a "branch and tree" configuration. The headend 64 is at the top of the tree and the settop terminals 57 are located throughout the trunk and branches. CATV signals originating at the headend 64 are sent to the plurality of settop terminals 2-57 and transmissions from each subscriber settop terminal 2-57 are received at the headend 64.

The network 118 begins with a plurality of coaxial or fiber optic trunk lines 82 coupled to the headend 64. At points where the coaxial transmission cable divides, signal splitters/combiners 58 are installed. Line dividers 62 and bi-directional signal amplifiers 90 are distributed throughout the CATV network 118 to boost transmitted signals and maintain nominal signal strength levels. Drop lines 98 branch lines 60, 88 and trunk lines 82 provide the bi-directional transport medium.

The settop terminal 57 includes a tuner 117, data receiver 110, for receiving communication from the headend 64, and a data transmitter 112, for permitting a subscriber to communicate with the headend 64. The data receiver 110 and data transmitter 112 may be fixed or frequency agile, depending upon the system requirements. The headend 64 includes at least one frequency agile RF data transmitter/receiver 68 for transmitting data to, and receiving data from, the plurality of settop terminal 2-57.

Figure 2:
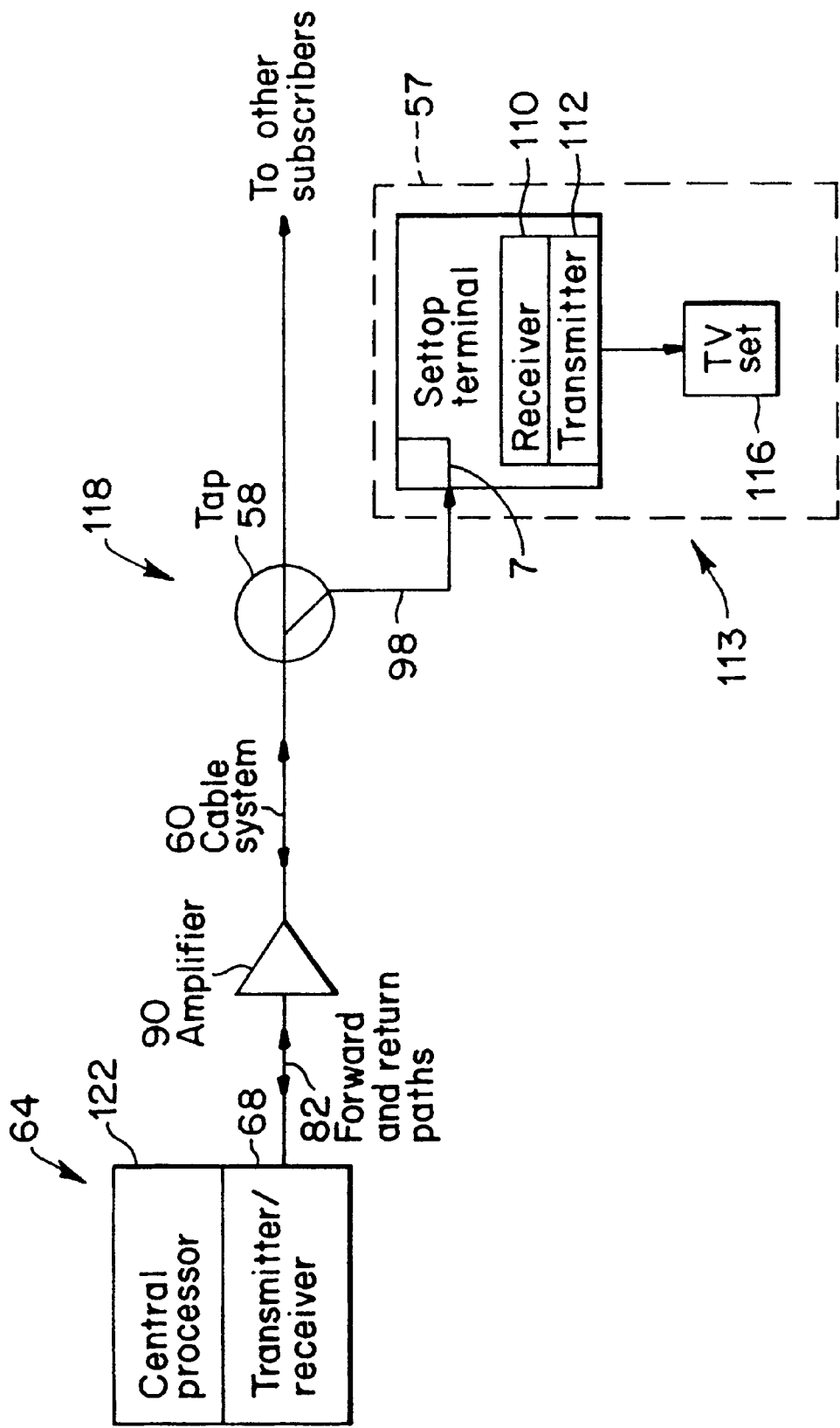
FIG. 2 is a simplified block diagram of the communication path between a subscriber and the headend.

A simplified block diagram of the communication path between a subscriber's installation 113 and the headend 64 in accordance with the present invention is shown in FIG. 2. At least one transceiver 68 transmits video and audio programs (either analog or digital), and data from the headend 64 to a subscriber's installation 113 which typically comprises a settop terminal 57 and a television set 116 or a VCR (not shown). As is well known by those skilled in the art, the transceiver 68 transmits programming on a plurality of CATV broadcast channels as assigned by the CATV network operator. Additionally, data-only channels may be provided for interactive communications. The plurality of broadcast and data channels are combined by a combiner (not shown) for transmission over the CATV network 118. Although only one settop terminal 57 is shown in FIG. 2, it should be understood that thousands of settop terminals 57 may communicate with a single headend 64.

The CATV network 118 is capable of supporting a bandwidth from approximately 5 MHz to over 750 MHz. The bandwidth above 50 MHz is typically utilized for transmitting signals in the downstream direction from the headend 64 to the settop terminal 57. The bandwidth below 40 MHz is typically reserved for transmitting signals in the upstream communication path from the settop terminal 57 to the headend 64. A guard band between 40 and 50 MHz may be used to separate the upstream and downstream bandwidths, although this is not required.

The headend 64 includes a central processor 122 which originates all data communications at the headend 64 such as billing statements, community interest information or special event notifications. Additionally, the central processor 122 retransmits communications received by the headend 64 from outside service providers such as banking or shopping network services.

The settop terminal 57 receives video and audio broadcasts from the headend 64 via a conventional tuner 117 and data transmissions via the data receiver 110. The video and audio programs are processed and forwarded to the television set 116 for viewing and listening by the subscriber in a manner that is well known to those skilled in the art. In the bi-directional CATV communication system of the present invention, the settop terminal 57 also includes the data transmitter 112 which enables the settop terminal 57 to transmit communications to the headend 64 over the upstream communication path. It should be apparent that all of the components within the CATV network 118 are bi-directional.

Figure 3:
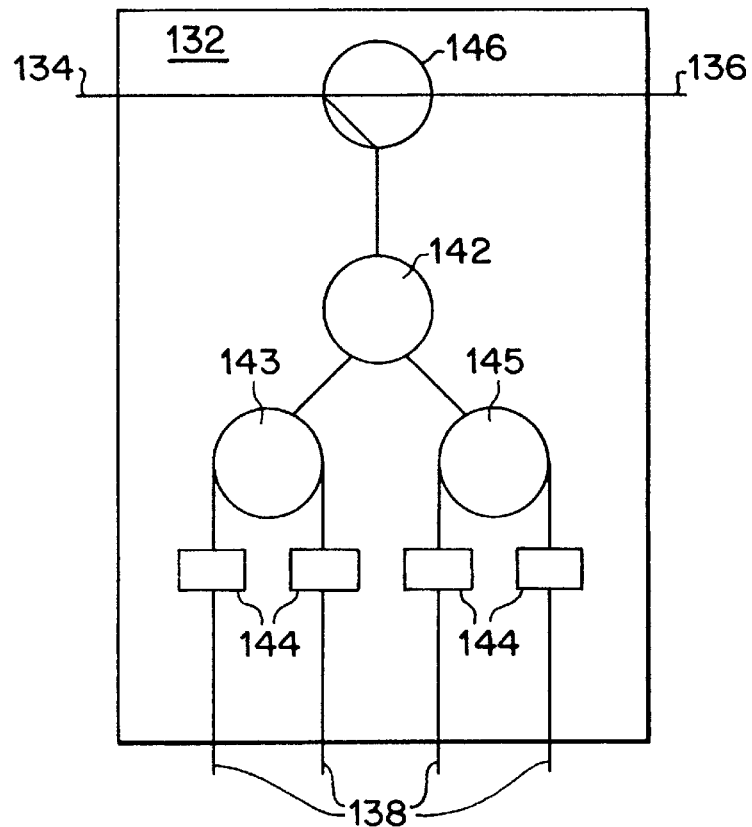
FIG. 3 is the preferred embodiment of the ingress noise reduction device of the present invention embodied in a subscriber tap.

Referring to FIG. 3, the preferred embodiment of the present invention is shown embodied in a subscriber tap 132. The tap 132 includes an input port 134, an output port 136 and four subscriber tap ports 138. The input port 134 is coupled to a directional coupler 146 which passes the CATV signal both to the output port 136 and to the subscriber tap ports 138. The signal is split again with splitters 142, 143, 145 depending the number of tap ports 138. As will be described in greater detail hereinafter, a slaved return-path filter (SRPF) 144 is preferably coupled between the signal splitters 143, 145 and each subscriber tap port 138. Alternatively, the SRPF 144 could be located between signal splitter 142 and signal splitters 143, 145 or between signal splitter 142 and the directional coupler 146. These alternative locations reduce the cost since there are fewer SRPF's 144 per tap port 138. However, the benefits from using the SRPF 144 will be slightly diminished if utilized in the alternative locations.

Figure 4:
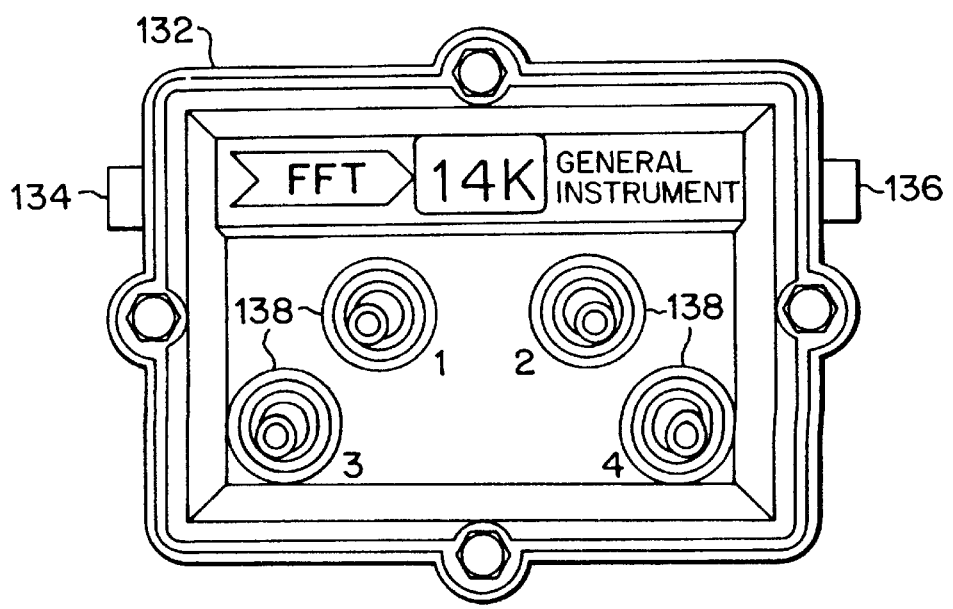
FIG. 4 is the device of FIG. 3 included within a weather tight housing.

As shown in FIG. 4, the subscriber tap 132 preferably includes a weather tight casing having input and output ports 134, 136 and a plurality of subscriber tap ports 138.

Figure 5:
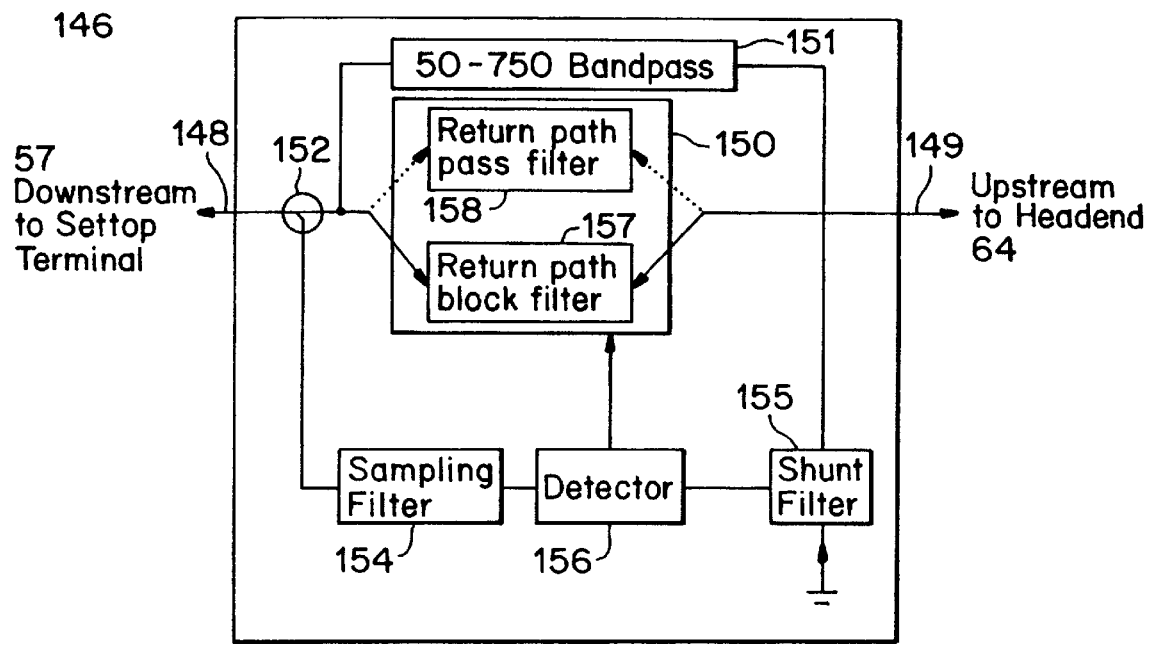
FIG. 5 is the slaved return-path filter (SRPF) in accordance with the present invention.

The preferred embodiment of the SRPF 146 in accordance with the present invention is shown in more detail in FIG. 5. The SRPF 146 comprises input and output ports 148, 149, a controllable filter 150, a downstream bandpass filter 151, a signal splitter 152, a sampling bandpass filter 154, a shunt filter 155 and a detector 156.

The downstream bandpass filter 151 permits communications from the headend 64 to pass through the SRPF 146 without interruption to the settop terminal 57. The controllable filter 150 comprises two filters: a return path block filter 157 and a return path pass filter 158. The block filter 157 permits a control signal from the settop terminal 57 to reach the sampling filter 154 when the shunt filter 155 is activated, as will be explained in detail hereinafter. The pass filter 158 permits communications from the settop terminal 57 to pass through the SRPF 146 to the headend 64 without interruption. The shunt filter 155 filters out all RF energy in the bandwidth of the upstream communication path, thereby blocking any unwanted ingress noise from entering into the CATV network 118 from the settop terminal 57.

The signal splitter 152 receives transmissions from the settop terminal 57 and directs a portion of the RF energy to the sampling filter 154. Preferably, the sampling filter 154 has a bandwidth equal to the bandwidth of the upstream communication path. The output of the sampling filter 154 is fed into the detector 156. The detector 156 will detect both RF ingress noise and valid transmissions from the settop terminal 57. However, the amplitude of a valid transmission will typically be several orders of magnitude greater than RF ingress noise. When the detector 156 detects RF energy above a pre-determined or relative threshold, it performs two functions. First, the detector 156 deactivates the shunt filter 155, thereby removing shunt filter 155 from the upstream communication path. Second, the detector 156 switches the block filter 157 out of the communication path and switches the pass filter 158 into the upstream communication path.

In standby operation, when the settop terminal 57 is not transmitting an upstream signal the block filter 157 is normally within the upstream communication path. The shunt filter 155 blocks all RF energy downstream of the SRPF 146 from entering the upstream communication path by shorting all frequencies within a select bandwidth to ground.

In active operation, when the subscriber desires to send an upstream transmission, the transmission is sent in the upstream communication path to the headend 64. The splitter 152 directs a portion of the RF energy from the upstream communication path to the sampling filter 154 and the detector 156. Although the shunt filter 155 shorts all frequencies within in a select bandwidth to ground, the block filter 157 permits transmissions from the settop terminal 57 to reach the sampling filter 154. The specific operation of all of the filters is well known to those skilled in the art and a detailed discussion of these filters is outside the scope of the present invention.

The upstream transmission from the settop terminal 57 is passed through the sampling filter 154 and is detected by the detector 156. The detector 156 deactivates the shunt filter 155 and causes the controllable filter 150 to switch the block filter 157 out of the upstream communication path and switch the pass filter 158 into the upstream communication path. Additionally, the detector 156 deactivates the shunt filter 155 for the duration of the valid transmission. The upstream transmission from the settop terminal 57 will pass through the input port 148, the controllable filter 150 and the output port 149 to the headend 64.

Once the valid transmission ceases and a pre-determined period thereafter has elapsed, the detector 156 activates the shunt filter 155 which will block all further RF transmissions in the upstream direction. The detector 156 also causes the controllable filter 150 to switch the pass filter 158 out of the upstream communication path and the block filter 157 into the upstream communication path.

To prevent any data from being lost while transmitting in the upstream communication path, the settop terminal 57 preferably transmits a preamble tone or sequence for detection by the detector 156. This prevents the loss of data should there be a short time delay in deactivating the shunt filter 155. If a specific preamble tone or signal is used, the detector 156 is preferably calibrated to detect the signal.

Power for the SRPF 146 is supplied from a power inserter on the CATV network 118, or from the settop terminal 57. Alternatively, power for the SRPF 146 may be derived from the RF energy being transmitted by the settop terminal 57 using a very high gain switch, such as a MOSFET.

Figure 6:
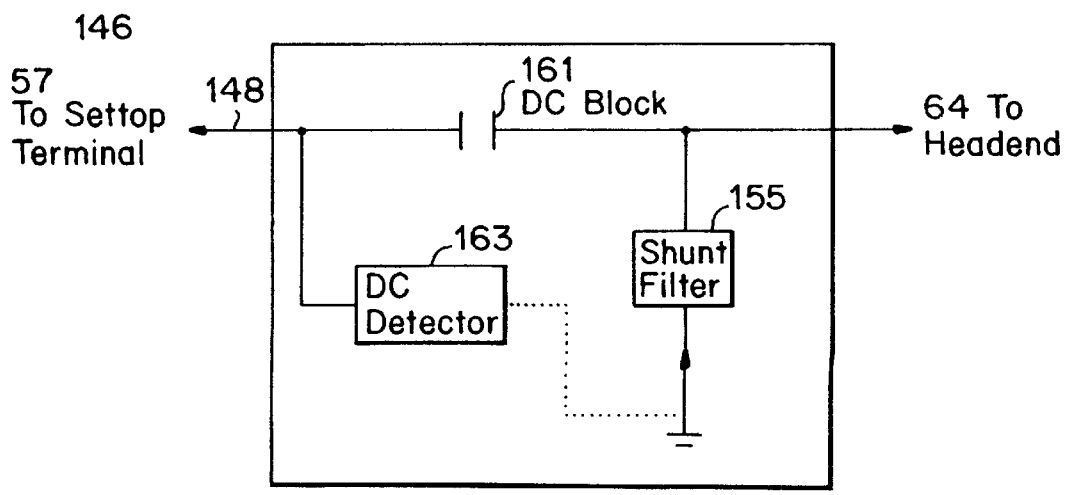
FIG. 6 is an alternative embodiment of the SRPF using DC signaling.

In an alternative embodiment, shown in FIG. 6, the settop terminal 57 may apply a DC voltage to activate or deactivate the SRPF 146 when a transmission in the upstream communication path is desired. The DC block 161 prevents the DC signal from proceeding upstream. The detector 163 detects the DC current or voltage and activates the trap filter 155 as required.

Although the SRPF 146 has been described as being located upstream of the subscriber tap 138, those of skill in the art should clearly recognize that the SRPF 146 may also be located between the tap 138 and the subscriber's home, inside the subscriber's home or even integrated as part of the settop terminal 57. The SRPF 146 may also be located at any point between the subscriber and the headend 64 on the CATV network 118.

Figure 7:
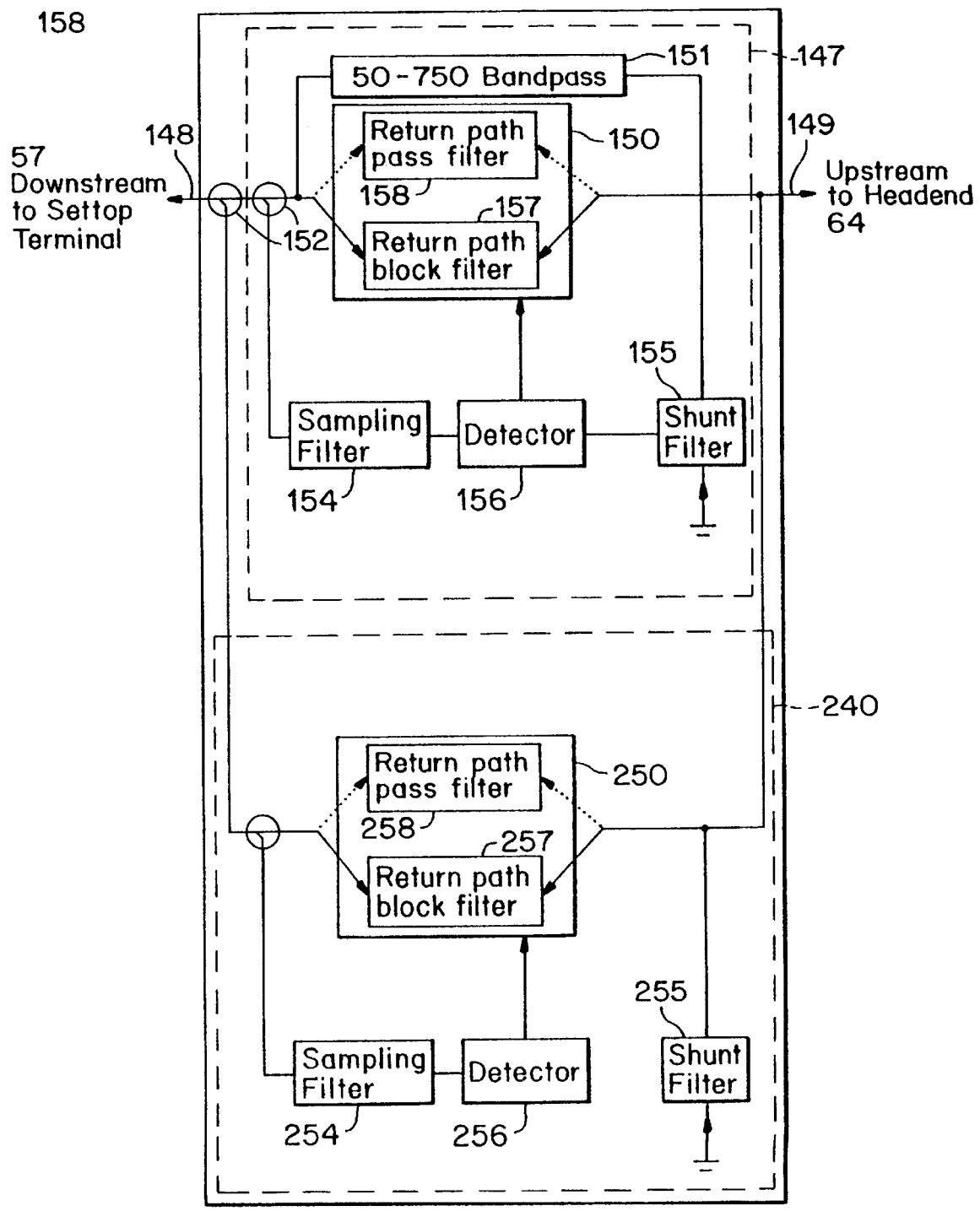
FIG. 7 is a second alternative of the SRPF which supports multiple frequency bands.

In a second alternative embodiment shown in FIG. 7, the SRPF 158 supports multiple frequency bands with multiple detectors 156, 256 and multiple sampling filters 154, 254. The upstream communication path may be partitioned between various pieces of equipment in the subscriber's premises which may desire upstream communication path access but are unrelated to each other. By partitioning the bandwidth, one class of service does not suffer any degradation of ingress noise due to the presence of other classes of service. For example, if cable telephony equipment utilizes the 15–30 MHz return bandwidth and CATV services utilize the 8–12 MHz bandwidth, the SRPF 158 comprises two units 147, 246, each comprising a sampling filter 154, 254, a detector 156, 256, a shunt filter 155, 255 and a controllable filter 150, 250. The first shunt filter 155 grounds the bandwidth of 8–12 MHz. The second shunt filter 255 grounds the bandwidth of 15–30 MHz. The units 147, 246 could be used individually, where only one type of service is present, or cascaded when both services are present.

Figure 8:
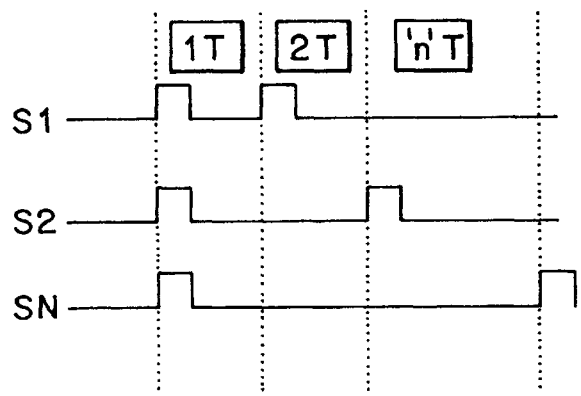
FIG. 8 is the signaling preamble utilized with a plurality of detectors.
Figure 9:
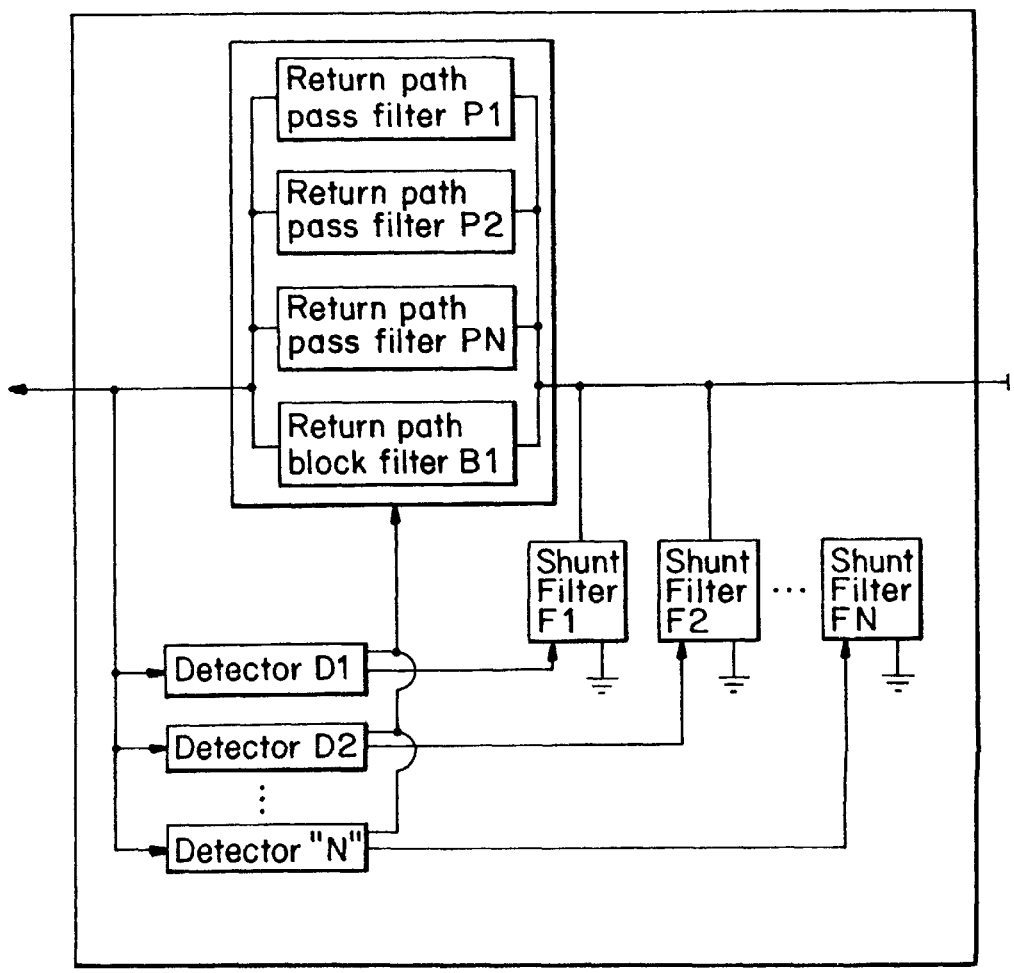
FIG. 9 is a plurality of detectors for segmenting the upstream bandwidth.

The upstream communication path may be divided into very small bandwidths, on the order of hundreds of kHz or less, each of which is controlled by a different SRPF. The activation or deactivation of a particular SRPF may be performed in several different manners. For example, the preamble to a valid transmission may include a timing signal as a shown in FIG. 8 which would be utilized with the embodiment having a plurality of detectors as shown in FIG. 9. In this embodiment, in order to activate detector D1, signal S1 is transmitted in the preamble. The detector D1 will detect two pulses separated by a duration of 1T. Upon the detection of this signal sequence, the detector 1T deactivates the corresponding trap filter F1 and activates the corresponding return path pass filter P1. Several pass filters P1–PH may be activated in parallel utilizing a plurality of corresponding detectors D1–DN and filters F1–FN to support multiple service simultaneously. In this manner, small segments of the upstream bandwidth may be selectively utilized. It should be clearly recognized by those skilled in the art that a different signaling scheme such as multi-level signaling may be utilized. Additionally, each detector may have a unique address and the preamble of a valid transmission may include the specific address of the detector corresponding to the desired portion of the upstream bandwidth to be used for the transmission.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A device for selectively passing RF energy in a CATV communication path from a settop terminal to a headend, comprising:

monitoring means for monitoring a selected bandwidth within the communication path;

detecting means having a unique address, responsive to said monitoring means, for detecting a valid communication signal transmitted from the settop terminal within at least a portion of said bandwidth, wherein said valid communication signal includes the unique address of said detecting means; and controllable filter means, responsive to said detecting means, for passing RF energy in said bandwidth portion when a valid communication signal has been detected and blocking all RF energy within said bandwidth portion with a shunt filter when a valid communication signal has not been detected.

2. The device of claim 1 further comprising a bandpass filter for permitting uninterrupted transmission of RF signals over a second portion of said selected bandwidth.

3. The device of claim 2 wherein said controllable filter means further comprises
a DC signaling block.

4. The device of claim 1 wherein said RF energy comprises said valid communication signal.

5. The device of claim 2 wherein said communication path is divided into a plurality of subbands and said monitoring means monitors a first selected subband within the communication band; the device further comprising:

second monitoring means for monitoring a second selected subband within the communication path;

second detecting means having a second unique address, responsive to said second monitoring means, for detecting a second valid communication signal transmitted within at least a portion of said second subband, wherein said second valid communication signal in said second subband includes the second unique address of said second detecting means; and second controllable filter means, responsive to said second detecting means, for selectively passing RF energy in said second subband when said second valid communication signal has been detected within at least a portion of said second subband.

6. The device of claim 1 wherein said valid communication signal has an associated preamble and said detecting means detects said preamble to determine if said valid communication signal is within said bandwidth.

7. The device of claim 6 further comprising a bandpass filter for permitting uninterrupted transmission of RF signals over a second selected bandwidth.

8. The device of claim 6 wherein:

the preamble contains an address; and the controllable filter means passes the RF energy within said bandwidth portion when the preamble address is detected and corresponds to the unique address of the detecting means.

9. The device of claim 6 wherein the communication path is divided into a plurality of subbands, and valid signals with preambles are transmitted on at least one of the subbands; the device comprising a plurality of:

monitoring means, each monitoring means for monitoring a subband within the communication path;

detecting means, each detecting means responsive to a respective monitoring means, for detecting the respective preamble within the respective subband;

controllable filter means, each filter means responsive to a respective detecting means, for passing the respective subband when the respective preamble has been detected to allow all of a valid signal associated with the respective preamble to pass through the device; and further comprising a bandpass filter for permitting uninterrupted transmission of subbands within the plurality of subbands.

10. A device for selectively passing RF energy over a CATV communication path from a settop terminal to a headend having a plurality of subbands comprising:

a plurality of monitoring means, each having a unique address and each for monitoring a different selected subband within the communication path;

a plurality of detecting means, each responsive to one of said monitoring means, for detecting a valid communication signal transmitted from a settop terminal within the selected subband, wherein said valid communication signal includes the unique address of at least one of said monitoring means; and a plurality of controllable filter means, each responsive to one of said detecting means, for passing RF energy over the selected subband when a valid communication signal has been detected within the selected subband and blocking all RF energy within said bandwidth portion with a shunt filter when a valid communication signal has not been detected within the selected subband.

11. A device for selectively passing RF energy in a CATV communication path from a settop terminal to a headend responsive to a transmitted DC signal, transmitted within said path, which indicates when to pass the RF energy comprising:

detecting means for detecting the transmitted DC signal from the settop terminal; and filter means, responsive to said detecting means, for selectively passing RF energy as indicated by the DC signal.

12. The device according to claim 11 further comprising a DC signaling block to prevent passing of the DC signal along the communication path.

13. The device according to claim 12 wherein the filter means comprises a shunt filter for blocking all RF energy within a selected bandwidth.

* * * * *

UNITED STATES PATENT AND TRADEMARK OFFICE
CERTIFICATE OF CORRECTION

PATENT NO. : 5,937,330
DATED : August 10, 1999
INVENTOR(S) : Vince et al.

It is certified that error appears in the above-identified patent and that said Letters Patent is hereby corrected as shown below:

At column 6, line 21, delete "P1-PH" and insert therefor --P1-PN--.

Signed and Sealed this

Twenty-eighth Day of December, 1999

Attest:

Q. TODD DICKINSON

*Attesting Officer*     Acting Commissioner of Patents and Trademarks